Jan. 5, 1937. G. SCHLENSKER 2,066,487
DISK JOINTER ATTACHMENT FOR PLOWS
Filed May 9, 1936

Inventor
Gottlieb Schlensker,
By J. Stanley Burch
Attorney

Patented Jan. 5, 1937

2,066,487

UNITED STATES PATENT OFFICE 2,066,487

DISK-JOINTER ATTACHMENT FOR PLOWS

Gottlieb Schlensker, Inglefield, Ind.

Application May 9, 1936, Serial No. 78,910

2 Claims. (Cl. 97—211)

This invention relates to an improved disk-jointer attachment for plows adapted for use in cutting the sod and turning the same slightly in advance of the breaking plow.

An important object of the present invention is to provide an attachment of the above kind including a concavo-convex cutting or jointer disk, and durable and efficient means for supporting and adjusting said disk.

A more specific object of the present invention is to provide an attachment of the above kind which is extremely simple in construction, durable, easy to apply, and embodying extremely efficient means whereby the cutting disk may be securely held and braced in any of its adjusted positions.

With the above and other objects in view, the present invention consists in the novel form, combination and arrangement of parts hereinafter more fully described, shown in the accompanying drawing and claimed.

Figure 1:
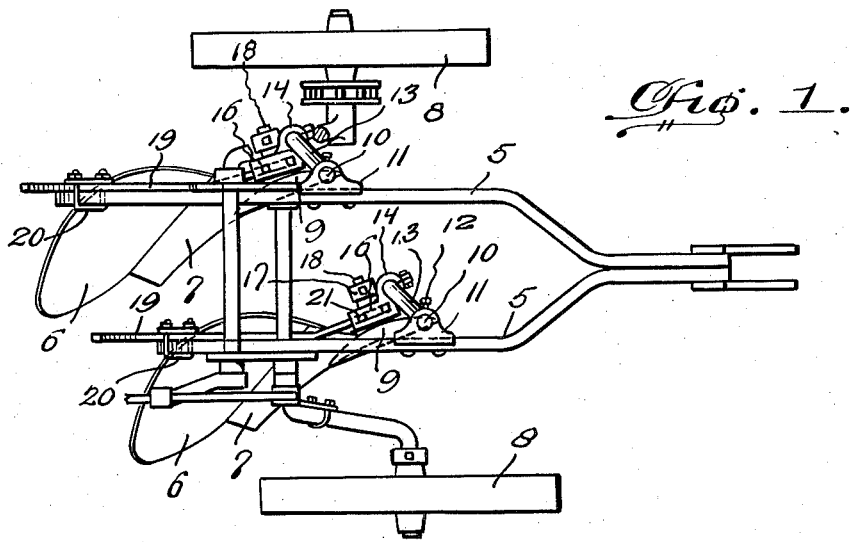
Figure 1 is a top plan view of a wheeled multiple-implement plow provided with disk jointer attachments constructed in accordance with the present invention.
Figure 2:
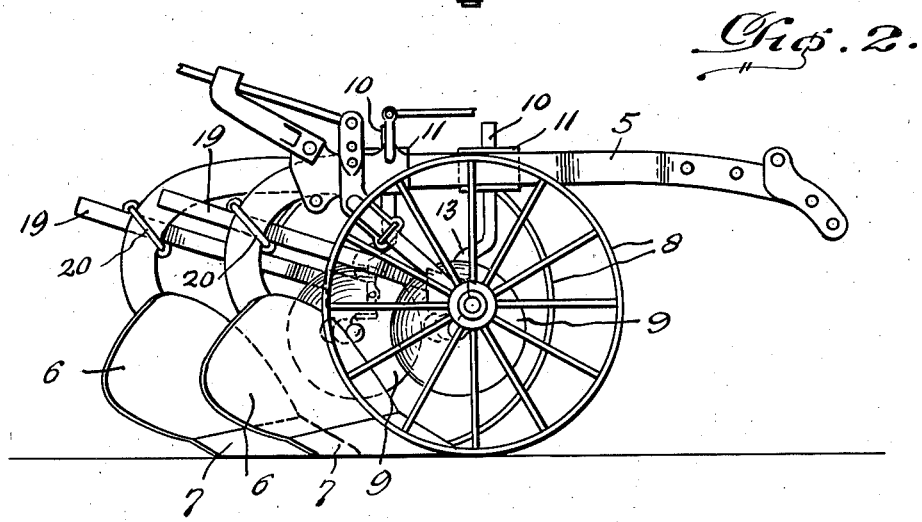
Figure 2 is a side elevational view thereof.
Figure 3:
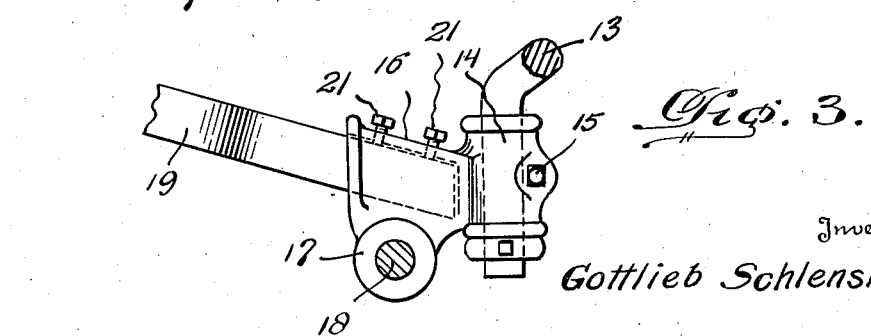
Figure 3 is an enlarged fragmentary view illustrating details of the supporting and adjusting means for the cutting disk.

While the attachment of the present invention is shown as applied to each of the implements of a multiple-implement wheeled plow, it will be understood that the invention is applicable to other types of plows. The plow shown embodies two implements, each including a steel beam 5, a mold board 6, and a share 7. The forward ends of the beams 5 are offset laterally toward each other and then extended in contiguous relation for connection with a common draft appliance or means. Also, these implements are suitably mounted upon supporting wheels 8 in any well known or preferred manner, usually to provide means whereby the implements may be raised or lowered to adjust the depth of the furrows being cut.

In accordance with the present invention, I provide an attachment for each implement including a concavo-convex cutting disk 9 adapted to be supported slightly above and in advance of the associated share 12 for cutting the sod and turning the same slightly in advance of said share. The supporting and adjusting means for the cutting disk 9 includes a standard 10 secured at its upper end in a socket 11 rigidly fastened to the associated beam 5, the upper end portion of said standard being slidably adjustable longitudinally through said socket 11 as well as rotarily adjustable therein. Suitable means is provided for securing the adjustment of standard 10 in socket 11, such as a set screw 12.

The standard 10 is offset laterally intermediate its ends as at 13, and mounted on the lower end portion of standard 10 is a clamping collar 14. The lower end of standard 10 and the clamping collar 14 are relatively rotatably adjustable, the desired relative adjustment being secured by means of a clamping screw 15 of said collar. Rigid with and extending rearwardly from the collar 14 is a socket member 16 formed at the bottom with an integral transversely apertured boss 17 in which is secured one end of a horizontal stub shaft 18 on which the jointer or cutting disk 9 is journaled. It will thus be seen that by rotarily adjusting standard 10 relative to socket 11 and by rotarily adjusting clamping sleeve 14 relative to the lower end of standard 10, the angle of the cutting disk 9 to the path of travel of the plow may be changed as desired. It will further be seen that by longitudinally adjusting the standard 10 relative to socket 11, the cutting disk 9 may be adjusted vertically for varying the depth of the cut or furrow made by said cutting disk in use.

In order to effectively secure and brace the cutting disk 9 in the desired position, I provide a brace rod 19 having its forward end engaged and secured in the socket 16 and securely clamped near its rear end to the associated beam 5 directly above the associated mold board 6, as indicated at 20. Set screws 21 may be used to secure the forward end of brace bar 19 in socket 16, and by loosening clamp 20, the bar 19 may be longitudinally adjusted relative to the beam 5 whenever it is desired to change the angular position of the cutting disk 9, the bar 19 being flexed laterally as may be desired for this purpose. While the set screw 12 and clamping screw 15 will serve to secure the associated parts in relatively adjusted positions, they will not effectively maintain the adjustments against the severe strain imposed thereon in actual use of the attachment. It is to positively maintain these adjustments under the severe conditions of actual use of the attachment, that the brace bar 19 is provided, as well as to reinforce the parts against distortion or breakage. Obviously, when the cutting disk 9 has been adjusted to the desired angular position with respect to the path of travel of the plow, the set screw 12 and clamping screw 15 are tightened and then the clamp 20 is tightened, thus presenting the attachment in condition for use.

From the foregoing description, it is believed that the construction and operation, as well as the advantages of the present invention, will be readily understood and appreciated by those skilled in the art. It will be seen that the parts are simple and durable in construction and that the attachment can be readily applied to the plow and adjusted as desired. Minor changes in the details of construction illustrated and described are contemplated within the spirit and scope of the invention as claimed.

What I claim as new is:

1. A disk jointer attachment for plows including a vertical standard, means for attaching the upper end of the standard to the beam of a plow for rotary and vertical adjustment relative to said beam, a socket member rotatably adjustable relative to and mounted on the lower end of said standard, a stub shaft rigid with and extending laterally from said socket member, a jointer disk journaled on said stub shaft, and a brace bar having one end engaged in said socket and adapted to be secured at its other end to the plow beam for bracing the standard against rearward strains and maintaining the desired angular adjustment of the jointer disk relative to the path of travel of the plow, said socket member being open at the rear and having means to secure the adjacent end of said brace bar therein.

2. A disk jointer attachment for plows including a vertical standard, means for attaching the upper end of the standard to the beam of a plow for rotary and vertical adjustment relative to said beam, a socket member rotatably adjustable relative to and mounted on the lower end of said standard, a stub shaft rigid with and extending laterally from said socket member, a jointer disk journaled on said stub shaft, a brace bar having one end engaged in said socket and adapted to be secured at its other end to the plow beam for bracing the standard against rearward strains and maintaining the desired angular adjustment of the jointer disk relative to the path of travel of the plow, said socket member being open at the rear and having means to secure the adjacent end of said brace bar therein, and a clamp for securing the rear end of said brace bar to the plow beam for longitudinal adjustment relative to such beam in accordance with the angular adjustment of said jointer disk.

GOTTLIEB SCHLENSKER.